US012596826B2

(12) United States Patent
Tiwary et al.

(10) Patent No.: US 12,596,826 B2
(45) Date of Patent: Apr. 7, 2026

(54) AUDIT LOG GENERATION AND PROCESSING FOR CLUSTER FILE SYSTEM SERVICEABILITY

(71) Applicant: Dell Products L.P., Round Rock, TX (US)

(72) Inventors: Vishal Tiwary, Sunnyvale, CA (US); Philip Shilane, Newtown, PA (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/424,514

(22) Filed: Jan. 26, 2024

(65) Prior Publication Data

US 2025/0245364 A1     Jul. 31, 2025

(51) Int. Cl.
*G06F 21/62* (2013.01)
*G06F 16/17* (2019.01)
*G06F 16/182* (2019.01)

(52) U.S. Cl.
CPC ...... *G06F 21/6218* (2013.01); *G06F 16/1734* (2019.01); *G06F 16/182* (2019.01)

(58) Field of Classification Search
CPC . G06F 21/6218; G06F 16/182; G06F 16/1734
USPC .......................................................... 726/1
See application file for complete search history.

(56) References Cited

U.S. PATENT DOCUMENTS

| | | | | |
|---|---|---|---|---|
| 10,417,728 | B1 * | 9/2019 | Yoggi | G06Q 50/60 |
| 12,126,506 | B1 * | 10/2024 | Ma | H04L 43/067 |
| 2014/0304401 | A1 * | 10/2014 | Jagadish | H04L 41/069 709/224 |
| 2015/0350214 | A1 * | 12/2015 | Gilpin | H04L 63/08 726/5 |
| 2018/0109561 | A1 * | 4/2018 | Kegel | H04L 9/3234 |
| 2019/0026174 | A1 * | 1/2019 | Basavarajappa | G06F 11/0709 |
| 2023/0034587 | A1 * | 2/2023 | Ranka | G06F 11/0775 |
| 2023/0342661 | A1 * | 10/2023 | Rama | G06N 3/045 |
| 2024/0015169 | A1 * | 1/2024 | Damodaran | H04L 63/1416 |
| 2024/0054548 | A1 * | 2/2024 | Catone | G06Q 10/1095 |

* cited by examiner

*Primary Examiner* — Lan Dai T Truong
(74) *Attorney, Agent, or Firm* — Staniford Tomita LLP

(57) ABSTRACT

A multi-node, multi-container cluster system that generates, aggregates, and manages log files from services and components to be used for audit logs used by an auditor. Logs are collected from all components of the system and aggregated using a central persistent volume for non-critical applications and additional dedicated persistent volumes for critical tasks. Audit logs are formatted to provide a consistent logging format in conformance with relevant corporate and government requirements. Log files are stored persistently outside of pods to ensure high availability for any audit log management needs. Audit logs can be exported to external, secure syslog server, and can be made subject to defined retention policies, as needed.

13 Claims, 11 Drawing Sheets

200

202

203

600

800

COPY LOGS FROM NODE MOUTING A PV WITH THE LOGS
802

ADD PV MOUNTER POD TO MOUNT ALL PV's WITH THE
APPROPRIATE LABEL
804

RESTART IF PVs SWITCH DEVICES DUE TO FAILURES
806

950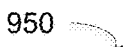

| | |
|---|---|
| SYSTEM CHANGES<br>952 | 1. Availability state changes (e.g., system shutdown)<br>2. Component failures (e.g., device, memory errors)<br>3. Configuration changes (e.g., add device, install app)<br>4. Change to source code in production<br>5. Change configuration of production system |
| AUTHENTICATION/<br>AUTHORIZATION<br>954 | 1. Failure authentications (e.g., login fail, account lockout)<br>2. Failed accesses (e.g., insufficient permissions)<br>3. Identity and access provisioning (create, grant, change) |
| PRIVILEGED ACCESS<br>956 | 1. Access to privileged functions (e.g, admin, superuser)<br>2. Actions using root or admin privileges |
| AUDIT-RELATED<br>ACTIVITIES<br>958 | 1. Changing event logging configuration<br>2. Deleting event logs<br>3. Audit log failure |

FIG. 10

AGGREGATE LOGS FROM COMPONENTS
1302

WRITE LOG FILES TO DEDICATED PV FOR CRITICAL
COMPONENTS/SERVICES
1304

WRITE LOG FILES TO CENTRAL PV FOR ALL NON -
CRITICAL COMPONENTS/SERVICES
1306

TRANSFER TO AUDIT LOG MANAGEMENT SYSTEM
1308

1000

I/O Controller
1021

System Memory
1015

Processor
1010

Speaker
1040

Bus 1045

Display Adapter
1025

Serial Port
1030

Keyboard
1017

Mass Storage
1020

Network Interface
1035

Monitor
1011

AUDIT LOG GENERATION AND PROCESSING FOR CLUSTER FILE SYSTEM SERVICEABILITY

TECHNICAL FIELD

Embodiments are directed to distributed networks, and more specifically to facilitating audits of system event information for cluster network systems.

BACKGROUND

A distributed (or cluster) filesystem is a type of file system in which data is spread across multiple storage devices as may be provided in a cluster of nodes. Cluster network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software. In this type of network, the file system is shared by being simultaneously mounted on multiple servers. This type of distributed file system can present a global namespace to clients (nodes) in a cluster accessing the data so that files appear to be in the same central location. Such distributed file systems are typically very large and may contain many hundreds of thousands or even many millions of files, as well as services (applications) that use and produce data.

The Santorini file system represents a type of cluster network system that stores the file system metadata on a distributed key value store and the file data on object store. The file/namespace metadata can be accessed by any front end node, and any file can be opened for read/write by any front end node.

Because of their extensive scale and complex component features, cluster systems are typically provided by vendors and installed for use by customers (users). Consequently, vendors must be provided with comprehensive system operation and issue information to provide ongoing support and debugging services to these users. Such information is provided in the form of log data or 'logs' that record operations performed by the system components (e.g., nodes, pods, services, interfaces, etc.) in log files. In large scale cluster executing several applications or services, the type and number of log files can be significantly large. Logs are used as a primary source of information when trying to debug a problem in the system. Managing and processing log files is thus an important factor in providing serviceability of cluster networks.

Certain organizations, such as government agencies, public companies, and so on may be required to retain audit logs to comply with applicable requirements imposed under corporate and governmental guidelines. Such rules impose event logging requirements that allow agencies to collect the same type of data consistently making it easier to analyze and share information across agencies. Audit logs are used to capture relevant information, such as event names, descriptions, timestamps, entities that create/edit/delete the event, and entities that are impacted by the event, and so on. Present systems, however, are generally not capable of processing and utilizing standard log information to generate audit logs without extensive per-node processing.

What is needed, therefore, is an audit log process that gathers the necessary system and log information for cluster networks and generates appropriate audit logs for the system as a whole.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 10 is a table illustrating logged events in a cluster network, under some embodiments.

DETAILED DESCRIPTION

Figure 1:
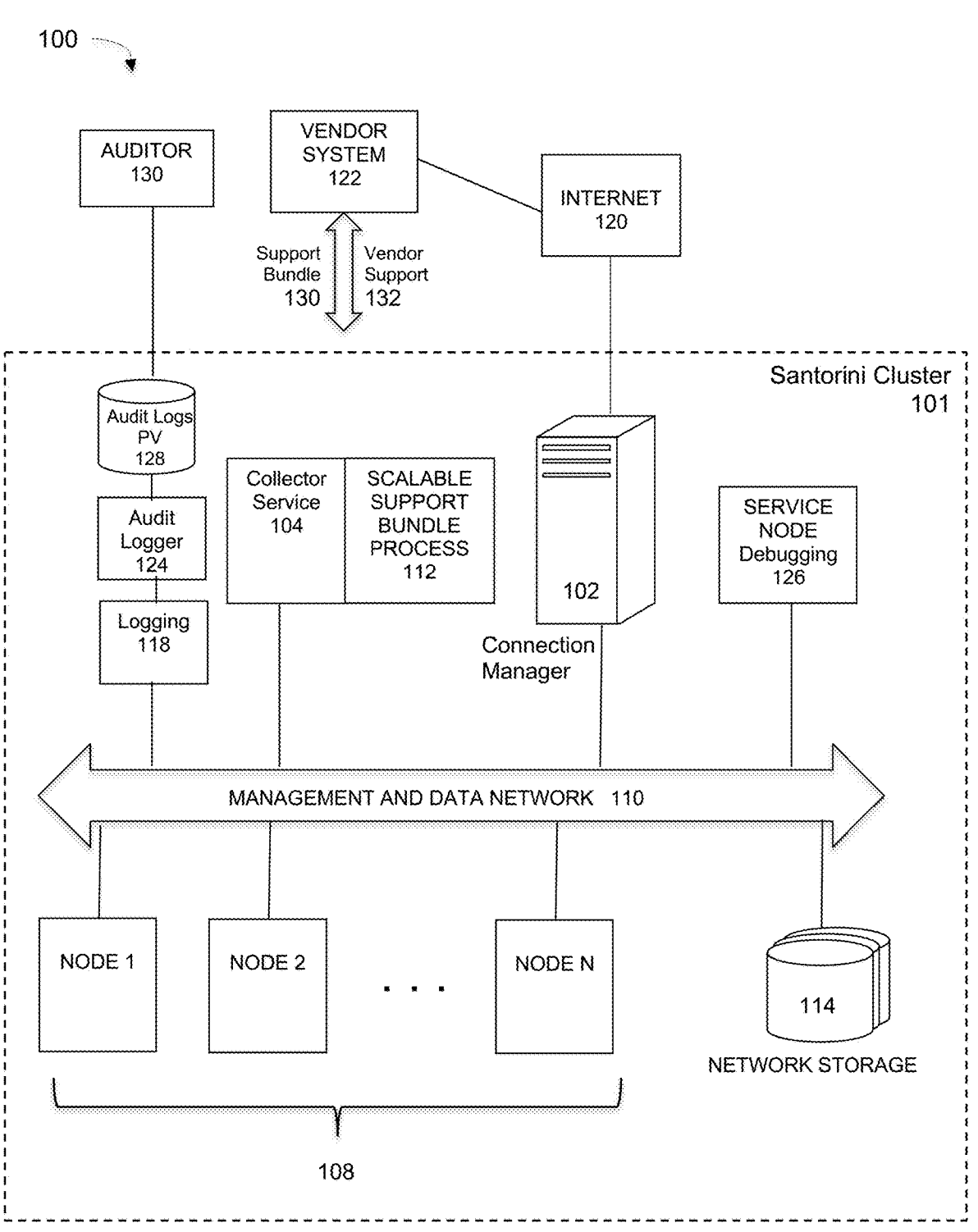
FIG. 1 is a block diagram of illustrating a distributed system for generating and transferring audit logs in cluster networks, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a support bundle processing for cluster network file systems (e.g., Santorini) including a mechanism to collect support bundles from the network across all of the components and nodes in the cluster. A collector service component gathers the information necessary for an overall system support bundle. System and log information is collected from each component and persistent volumes on each node while applying filter criteria. The collection is scalable by collecting from each node in parallel with a coordinator-worker design.

Embodiments are further directed to a cluster network debugging solution that provides a single product suite that provides information through a single interface, and that considers a full set of logs and system information to allow a vendor to analyze and debug problems encountered in any part of the cluster network.

FIG. 1 is a block diagram illustrating a distributed system implementing comprehensive logging and audit log generation for cluster networks, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system 101 (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and a connection manager 102 through network 110. The connection manager can control automatic failover for high-availability clusters, monitor client connections and direct requests to appropriate servers, act as a proxy, prioritize connections, and other similar tasks.

In an embodiment, cluster network 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case the Santorini network 101 supports various related filesystem and data managers, such as PPDM, as well as services such as ObjectScale and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Cluster network 101 includes a network 110 and also provides connectivity to other systems and components, such Internet 120 connectivity. The networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

As shown in FIG. 1, network 101 includes a collector service 104 and scalable support bundle servicing process 112 that is executed by the system to manage the processing of support bundle information from and for users/customers of the system. Process 112 may be a process executed by a specialized node as a specially configured management or control node in system 100. Alternatively, it may be executed as a server process, such as by server 102 or any other server or client computer in the system. The support bundle process 112 works with the other components of the distributed system and may use certain services or agents that run on each compute node 108 in the distributed system, such as may be implemented as a daemon process running in each node. As generally understood, a daemon is a computer program that runs as a background process, rather than being under the direct control of an interactive user.

As shown in FIG. 1, overall system 100 includes a vendor system 122 operated by a vendor or producer of one or more of the applications, operating systems, or resources of the cluster network 101. Such a vendor may be called upon to resolve issues or provide fixes to problems encountered by users of these products. In an embodiment, support bundle information 130 is transmitted to the vendor, such as over the Internet 120 or over a local network link, and the vendor, in turn, provides back support in the form of bug fixes, patches, revisions, etc., that the user can install or execute in the cluster. In an embodiment, certain debugging tools are provided in a node, such as a service node 126 to help the vendor analyze and process a support bundle file comprising core files for multiple nodes in cluster 101.

In an embodiment, cluster network 101 implements containerization technology through a Kubernetes implementation. A container is a virtualized computing environment to run an application program as a service or microservice, and are lightweight, portable data constructs that are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In Kubernetes, a pod is the smallest deployable data unit that can be created and managed. A pod is a group of one or more containers, with shared storage and resource requirements. Pods are generally ephemeral entities, and when created, are scheduled to run on a node in the cluster. The pod remains on that node until the pod finishes execution.

In an embodiment, the support bundle process 112 is used in a clustered network that implements Kubernetes clusters. One such example network is the Santorini system or architecture, though other similar systems are also possible.

Figure 2:
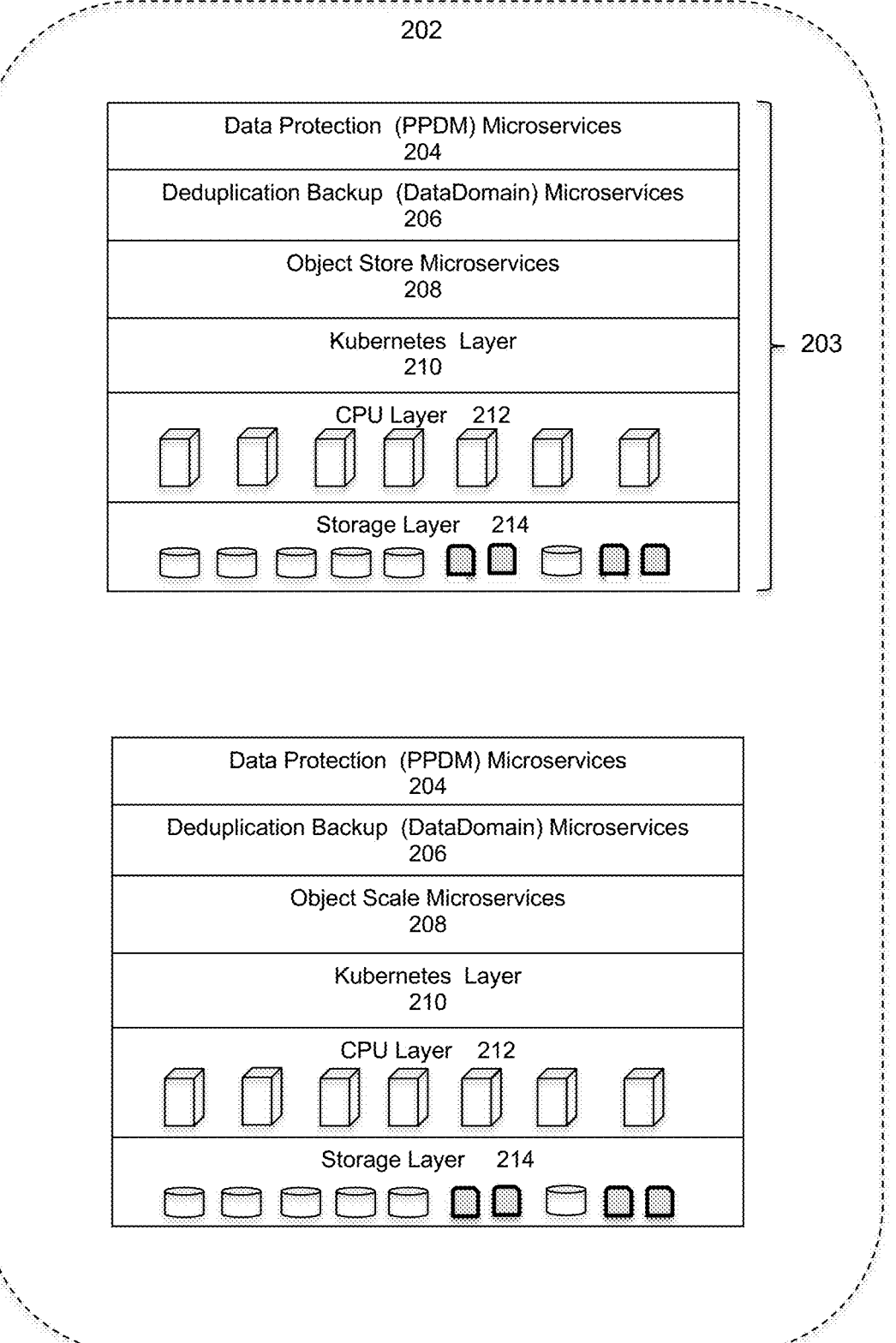
FIG. 2 illustrates a high-level overview of a network cluster using the Santorini architecture, under some embodiments.

FIG. 2 illustrates a high-level overview of a network cluster using the Santorini architecture, under some embodiments. In system 200 of FIG. 2, a two-node cluster 202 is shown. Each node 203 consists of several distinct components or processing layers. For the example shown, a node includes a PowerProtect Data Manager (PPDM), or similar microservices layer 203, a Data Domain (deduplication backup) appliance microservices layer 206, an object storage (e.g., Dell ObjectScale) microservices layer 208, a Kubernetes layer 210, a processor layer 212, and a storage layer 214 including different types of storage media, such as HDD, Flash memory, SSD memory, and so on. Each of these component products consists of multiple microservices, and as more nodes are added, Santorini scales CPU, storage, RAM, and networking accordingly. Other layers can also be included, and a cluster 202 may comprise any practical number of nodes 203. The PPDM represents a cloud-native data protection manager system, and ObjectScale represents a scalable object storage manager.

As shown in FIG. 2, embodiments of the cluster network 200 through DD microservices 206 utilize Data Domain backup appliances to provide streaming deduplication, and which use the Data Domain File System (DDFS) as an inline data deduplication filesystem. As data gets written to the filesystem, DDFS creates variable sized segments and writes the unique segments to a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated filesystem that forms segments from data, these segments are uniquely identified by their key/label called a 'fingerprint.' Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

With respect to the directory tree structure of the data processed in system 100, various different data structures can be supported by the file system (e.g., DDFS or Santorini filesystem). A B+ Tree is self-balancing tree structure and is a variant of a standard B Tree, and Each file inode is stored in the B+ Tree as a data blob using the parent directory inode number and the child file inode number as the key. A B+ Tree key structure composed of the parent directory inode as the primary key and child file inode as the secondary key to construct the full key. An Mtree is a tree data structure similar to a B+ Tree (or R-tree), which is constructed using a metric and relies on triangle inequality for efficient range and k-nearest neighbor queries. As with other tree-based data structures, the Mtree is composed of nodes and leaves. In each node there is a data object that identifies it uniquely and a pointer to a sub-tree where its children reside. Every leaf has several data objects A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

A Data Domain or similar system can efficiently copy an existing file using the same underlying Merkle tree. It creates the new file with a new name, and therefore a new L6 root of the tree, but that tree then references the identical LP chunks. As this operation involves only the root of the tree, it is trivially fast and does not increase physical space in use beyond the one chunk containing the L6.

In an embodiment, the PPDM (PowerProtect Data Manager) microservices layer 204 builds on the Data Domain system 206 to provide data protection capabilities for VM image backups and Kubernetes workloads.

Upon creation of an Mtree, it can identify the domain on which the Mtree is created. All namespace metadata as well as the file data and metadata associated with a Mtree is allocated from resources owned by that domain. The Mtree names as well as Mtree IDs are unique across the cluster. Santorini exposes a global namespace that is a union of all namespaces in all domains.

Figure 3:
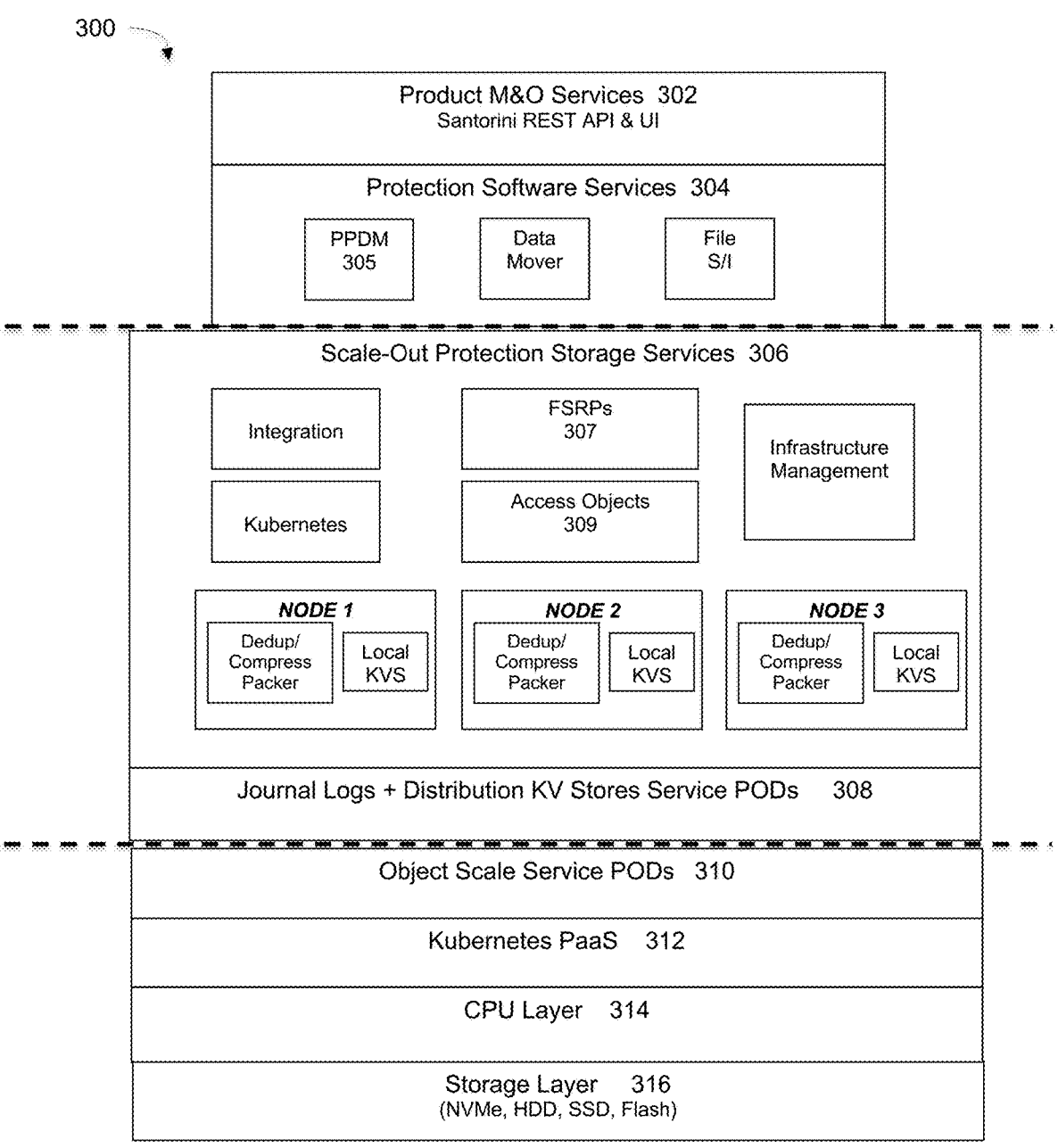
FIG. 3 illustrates details of the services related to the data path running in Santorini cluster network, under some embodiments.

FIG. 3 illustrates details of the services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., Power Protect Data Manager, PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store.

As an L1 is formed, a similarity group is calculated for the L1 based on the SHA1 fingerprints of the L0 segments (or other properties). The similarity group is checked against a mapping table, which leads to consistently routing the L1 based on its similarity group to an instance of a node's dedup/compress service. If similarity groups are in a range of 0-1023, then if there are four instances of the dedup/compress service, then the instances may uniquely be responsible for the ranges 0-255, 256-511, 512-767, 768-1023, though other mappings are possible. The dedup/compress instance will deduplicate the L0 segments relative to other fingerprints within the same similarity group. Other functionality exists in the dedup/compress service such as packing segments into compression regions, containers, and blobs that will be written to an underlying object storage such as provided by the object scale service layer 301, or an object store provided by the public cloud.

Distributed key value stores are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

Because of system complexity and variety of features and products, Santorini and other similar cluster systems are typically provided to users by different system providers, or 'vendors'. Such vendors usually provide the necessary hardware and software infrastructure necessary for users to install and deploy cluster networks in their own environment. As part of this service, vendors may also provide ongoing support in the way of bug fixes, system optimization, software upgrades/updates, configuration recommendations, and so on.

As products are developed for release and deployment, bug fixes, version iterations, and configuration support are important activities of the vendor. Such activities rely on timely and efficient interchange of information between the user and vendor to satisfactorily solve any issues that the user may encounter during and after system deployment. In an embodiment, this information is encapsulated in the form of 'support bundles' that comprise the relevant information and data used by the vendor to identify and solve user issues. As stated above, support bundle collection is a critical feature for Santorini, and similar systems, during both customer deployment and during product development. Support bundles are collected, transferred back to the vendor, and analyzed during debugging. Similarly, during development, engineers collect and analyze support bundles to understand problems in their code.

Figure 4:
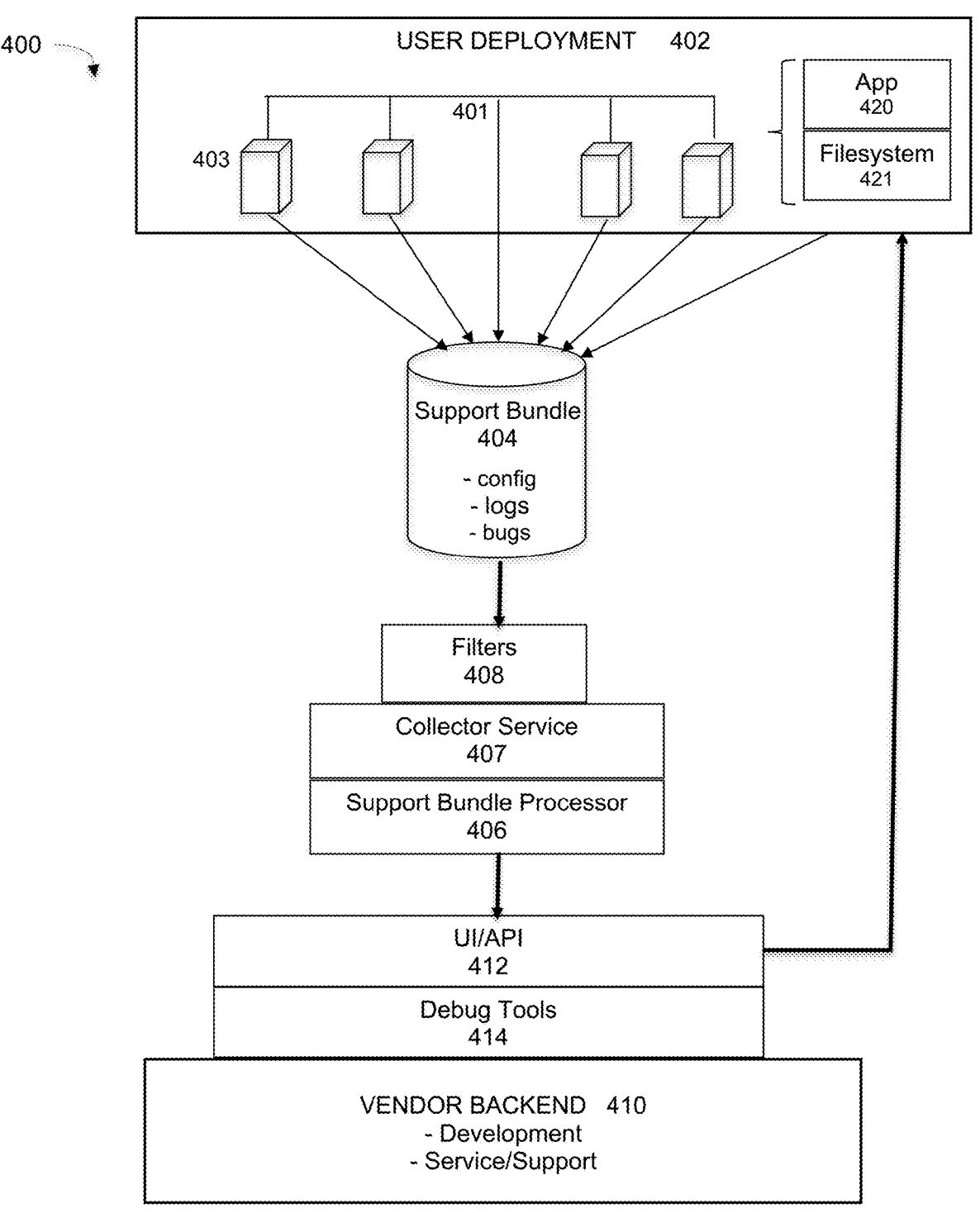
FIG. 4 illustrates the generation and transmission of support bundles between a user and vendor, under some embodiments.

FIG. 4 illustrates the generation and transmission of support bundles between a user and vendor, under some embodiments. As shown in FIG. 4, system 400 comprises a user system 402 having a deployed cluster network including a number of individual nodes 403 coupled to one another through network links 401. User system 402 can represent any appropriate cluster network, but the description will refer to a Santorini system, although embodiments are not so limited. Such a system may be used to implement any appropriate application 420 and file system 421, though the description may specifically mention a Data Domain-based deduplication backup application and the DDFS filesystem.

During installation, deployment, and use, system 402 may encounter various issues related to software/hardware operation, configuration, application compatibility, data corruption, and so on. Any number of issues may arise, and some may be directly addressable by the system vendor. For the embodiment of system 400, the vendor operates a backend system 410 that provides development and service/support functions to both produce the components for the user and debug, support, and improve these components as they are used. For this ongoing process, the user deployment 402 produces, usually on a periodic or on-demand basis, a support bundle 404 comprising any necessary information and data necessary for the vendor backend 410 to provide appropriate fixes, updates, patches, and so on, back to the user system. In an embodiment, the support bundle includes relevant configuration for each individual node 403 and network 401, and the overall system 402. It also includes any specific problem or bug issues, and log information for relevant events and transactions.

In general, a support bundle may include all of the logs written by the various services running within the cluster, as well as topology information listing which services are running on particular nodes and their version numbers. Hardware configuration information may also be included such as drive model numbers, MAC addresses for network cards, etc. Overall system information that may be included comprise total storage capacity, capacity currently utilized, and remaining capacity. Performance statistics may include read/write latencies, read/write throughputs, replication throughput, garbage collection performance, etc. Support bundle information can also include any identified failures such as offline nodes, hardware components, or services. An overall cluster identifier will be included in the support bundle such as a product identifier number. While this information could be gathered across the entire cluster in a single support bundle, filter criteria may also be applied to limit the information gathered to particular nodes and services.

The support bundle information 404 is provided to the vendor backend 410 through a user interface or application program interface (API) component 412 that can send and receive data and commands to and from the user system 402. The vendor system may also include debug tools 414 to correct any specific issues encountered in the user system. Other vendor components include any necessary customer service (personnel) support and/or development tools to address the issues encapsulated in the support bundle 404.

In an embodiment, the support bundle 404 is collected and provided to the vendor by a support bundle processor component 406 that includes a collector service 407 that collects support bundles from the Santorini network across all of the components and nodes in the cluster. The collector service component can be configured to specifically gather the information necessary for a Data Domain (or other application) support bundle.

The collector service 407 collects system configuration and operation information from each component (node, network, application, etc.) and collects logs from persistent volumes (PVs) on each node while applying filter criteria for one or more filters 408. The filters are configured to remove unnecessary data from the user to vendor transmission in a way that does not bottleneck the data flow. The collection is scalable by collecting from each node in parallel with a coordinator-worker design.

Figure 5:
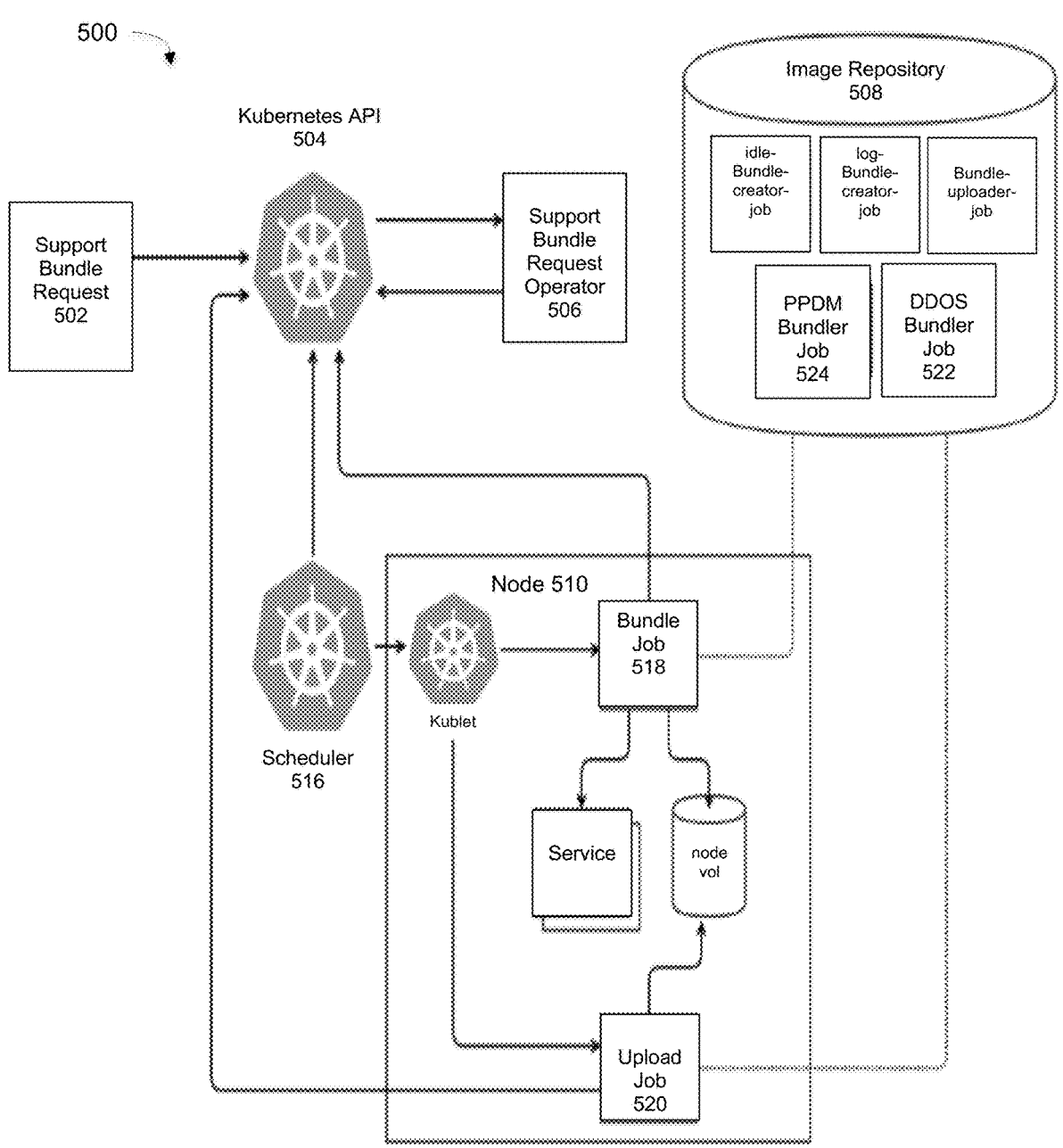
FIG. 5 illustrates components of a support bundle collector service, under some embodiments.

FIG. 5 illustrates components of a support bundle collector service, under some embodiments. System 500 illustrates component 406 of FIG. 4 in greater detail, and for an example embodiment of a Kubernetes-based implementation. As shown in FIG. 5, a support bundle request 502, as issued by a user or the system, triggers a Kubernetes API 504 call to trigger support bundle collection from operator 506. This call may include filter criteria to be applied to logs, such as time ranges, component types, and so on. This starts a scheduler 516 that creates a set of BundleJobs 518 for a node 510, where each job is based on a container image stored in an image repository 508. The BundleJob process 518 has the responsibility to create a support bundle for its area of responsibility and upload 520 the bundle to an interface or software component that will then transfer it to the vendor.

Different conditions can trigger or initiate a support bundle request. A typical use case is that the cluster has experienced some sort of problem that generates an alert that goes to the user and/or to the vendor. The user contacts vendor support (or support sometimes contacts the user first), and a support situation is initiated. The vendor directs the customer to generate a support bundle, which the user can do through a GUI or calling a REST API directly. The GUI has configuration options to set filter criteria and possibly set up a schedule for automatically generating a support bundle if that is deemed useful. Support bundles are usually initiated only when a problem is encountered and are typically not generated for normal cluster operation. The request may be configured to be automatically generated upon detection of a defined problem, error, or exception condition, or it can be manually triggered by the user upon such a condition or as needed/desired during cluster operation. An error condition automatically generating a support bundle request may be defined by any appropriate measurable situation, such as if capacity usage exceeds a threshold, processing bandwidth exceeds a maximum allowable percentage, and so on.

In an embodiment, the log files and various other information is gathered from individual nodes into a single support bundle by the DDOS bundler job 518. The support bundle 404 thus comprises individual sets of log and config/statistic information from each node, and which may comprise multiple files, that are then combined together into a single dataset (i.e., the support bundle), which can then be conveniently transferred to the vendor.

Figure 6:
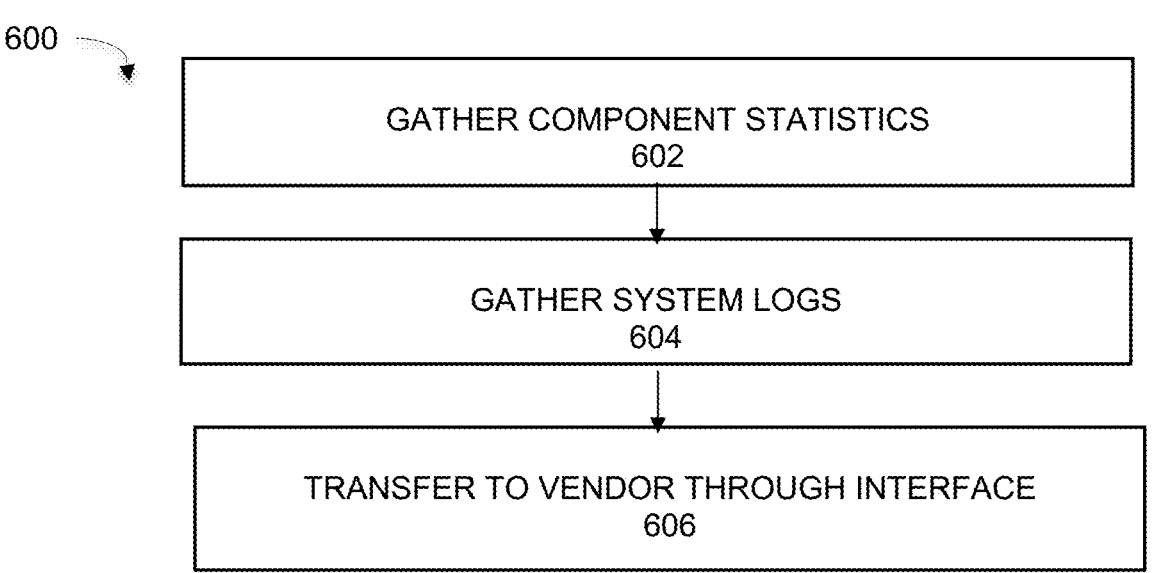
FIG. 6 is a flowchart that illustrates a method of gathering a support bundle for Data Domain in Santorini, under some embodiments.

FIG. 6 is a flowchart that illustrates a method of gathering a support bundle for Data Domain in Santorini, under some embodiments. As shown in FIG. 6, process 600 involves the three main steps of gathering component statistics, 602; gathering system logs, 604; and transferring the support bundle to in interface for transfer to the vendor, 606.

In an embodiment, the component statistics gathered in step 602 comprise component statistics. Each service may be queried by the support bundle collection service, and each service will provide information to include in a support bundle. As described above, this information may include statistics about the service such as counters, performance measurements, latencies, and other details that will allow support and engineers to understand its internal workings. Any error situations identified by the service can also be included in this information.

In an embodiment, process 112 uses certain core files for the data elements of the support bundle, such as the component statistics 602 and system logs 604. In an embodiment, 'core' files are files that include a captured memory state of the independent pods, rather than the cluster as a whole. A core file encapsulates the memory state of the pod (the constituent container or containers) at the time that a program crashes. Core files allow viewing and analysis of variables of the system by capturing memory states during normal operation and extraordinary events, such as system/program crashes, attacks, and so on. Such core files can then be processed by certain debugging tools. For example, a debugger tool may be attached to the memory core and the program binary to view the threads, variables, and system states around the event. Core files may be generated automatically upon detection of a crash by the operating system of the node and uses an auto-capture utility that captures the state at the time of the crash.

Core files can be formatted, stored, and processed in any appropriate manner, but should generally be stored consistently in memory. In an embodiment, core files are stored in each node at: /var/lib/systemd/coredump/. Core partitions stores both kernel and process core files. Core files can be compressed with zstd (or similar) compression, and may typically be on the order of 2 GB in size after compression. Core files are named and formatted to facilitate use in a multi-node, Santorini cluster, and so include more than simply name and timestamp information, such as may be common in single node systems.

An example core file format may be:
core.<podname>.<proc_name>.<uid>.<boot_id>.<pid>.<timestamp>.zst core.ddfsaob-1-0.ddfs.0.9a955b6ae94841c487d548874cacb863.13907.1679230726000000.zst A core dump helper service may be used to rename a core file name once a process core file is generated. A service can also be used to delete old core files (e.g., set to run every 30 minutes) since core files may tend to be large in size. Old crash core files can be deleted to make sure crash core file used space is smaller than 30 GB (or similar space). Similarly, it can delete old application core files, to make sure application core file used space is smaller than 220 GB (or similar). It can also rename application core files if there is a core file not renamed. Nodes may be configured to store core files for defined time periods, and generally core files are retained indefinitely until more space is needed, however, periodic memory saving operations may also be performed, for example the system may be configured to ensure that there is always 30 GB (for example) free on each node.

For security reasons, access to core files may be restricted or prevented. In an embodiment, a PV mounter pod is used access to core file directory. Such a PV mounter pod has heightened permissions depending on system configuration. This can be used to transfer core files through an interface to the vendor or system administrator, where debugging can then be performed.

In an embodiment, certain support bundle automation features may also be provided in conjunction with the core files, such as using existing scripts to process cores in a utility that is used to analyze core files, such as GNU Project debugger (GDB). Such a utility typically shows the state of a running node and the value of variables within the code at the time the core was generated. This can be used to return thread back traces and other details, and avoid transferring core files. Other features include automatically creating and transferring support bundles, providing user opt-in, avoiding delays when filing support tickets, and providing targeted support bundles with the option to gather more information later.

In an embodiment, certain end-to-end system observability tools may also be provided and used to track operations (e.g., backup/restore/replication, GC, etc.) across components and nodes. One such tool is a trace ID, which allows operations running in the system to be tracked across all of the various log files. Trace IDs provide a unique job ID that is associated with each operation (e.g., backup job). This ID flows through to all services handling the job and any print message also includes this ID allowing tracking through all of the log files for the job. Sub-operations can spawn a span ID that is used in conjunction with the main trace ID. These IDs comprise simple alphanumeric labels attached as metadata for the job. As the job is processed by different services and progresses through the system, the ID stays the same and is incorporated into the logs at each relevant stage. To ensure the integrity of the trace ID, span IDs can be used for any sub operations of the job, without touching the trace ID. Trace and span IDs can be used by one or more of the debugging tools provided in the system.

Log Generation

In a cluster network, each component/product has many services, and often many different instances of each service. Services may be started, stopped, and re-started, even on different nodes. Logging the execution and issue of processes across all of the components is necessary to diagnose any issues in the system, and logs should be available across container failures. With respect to FIG. 2, generally the microservices layers 204, 206, and 208 perform the logging functions.

As shown in FIG. 1, system 100 includes a logging processing component 118 that provides comprehensive creation, formatting, management and aggregation of logs to provide consistent and useful information to the scalable support bundle process 112. The logging subsystem (or function) 118 is configured to provide certain minimum logging requirements for the system. These include minimizing the risk of losing log lines, providing a consistent logging format for use by multiple nodes and resources in the system, imposing low resource overhead, and supporting the creation of support bundles from logs, among other requirements.

A primary logging requirement is to verify that a log was properly created and stored, and still has integrity when retrieved for use in debugging. Because of the great volume of logged data that potentially may be generated, it is necessary to provide resource (CPU, memory) saving mechanisms, and to properly aggregate logs from all of the different components/services in the system. In an embodiment, these and other goals are achieved by using a distributed persistent volume (PV) architecture that stores logs for critical applications in dedicated PV storage through a mounter pod, in addition to a standard central PV location, as described in further detail below.

Figure 7:
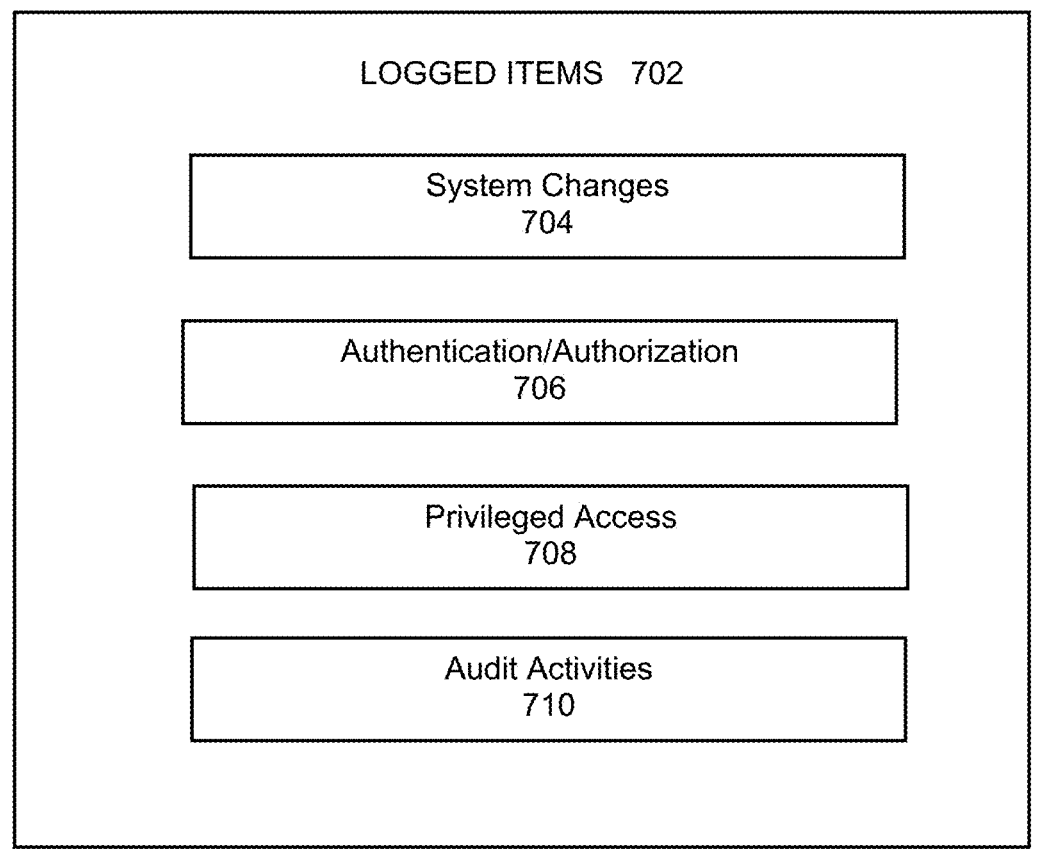
FIG. 7 is a list of events and items that are logged for all systems for support bundle processing, under some embodiments.

As shown in FIG. 6, step 604 comprises gathering system logs for the support bundle. In general, the following events are logged for all systems. FIG. 7 lists the events and items 702 that are logged for all systems. As shown in FIG. 7, the logged items 702 include system changes 704, which can comprise component availability state changes, such as nodes or processes shutting down; component failures and errors, such as device failures and recoverable memory errors; configuration changes, such as adding a device, installing an application or enabling a service; or changes to source code in production or configuration changes in a production system; and other similar system changes.

Logged items also include authentication and authorization events 706, such as authentication failures (e.g., login failures and account lockouts); failed accesses, such as insufficient permissions to access a database or transaction; or identity and access provisioning activities (e.g., creating new accounts, granting new permissions or changing existing permissions); and other similar activities. Privileged access events 708 can include access to privileged functions (e.g., using a super user level access (e.g., Linux sudo), running the administrative console or logging in as a normal user account; or all actions taken by any individual with root or administrative privileges. The audit-related activities 710 can include changing the event logging configuration or deleting event logs, or audit log failure, among others. FIG. 7 is provided for purposes of illustration and other items may also be logged as needed.

The system can implement log management using any one of a number of possible processes. A first process is to write log files directly to a persistent location. For this method, each pod must manage log rotation to maintain space within the persistent location. The technique involves limiting a log file ('log') to a specific upper size. When that size is reached, the log file is renamed such as to 'log.1' and a new, empty log file is available for new log lines, where a log line is generally a single line of printed text for a log. If log.1 exists, it is renamed to 'log.2', and this applies to other logs with conflicting names. The number of log files is limited based on a calculation of the space allowed for logging. By rotating the log names and deleting the highest numbered log, space is managed. This may only be supported for pods with node affinity, otherwise it would be complicated to manage logs across nodes if a service restarted on different nodes. This direct writing process generally involves only simple file writes, and avoids double-write overhead; it does, however, require that each pod must manage its own internal logs, and does add some complexity to support bundle collection.

A second method of writing log files is to write the log files to local files and use a sidecar. Many pods in a Data Domain system already write logs to local files, so a sidecar can be used to track directories and file extensions for updates. The sidecar will copy the log lines to the persistent location. For this method, legacy log file usage is supported, and log management is handled by rsyslogd (or similar) pod. This method, however, imposes a double-write overhead, and the need for each pod to manage its internal logs. There is also a small risk of possible loss of log lines when log lines are transferred from the sidecar to rsyslogd. As used in this description, a 'sidecar' is Kubernetes container that tracks log files in a pod and can be used to transfer these files to other services, storage, etc.

A third method of writing log files is to write to STDOUT and use Fluentbit, for example, which are standard Kubernetes service to copy log files from a pod to persistent volume. Kubernetes typically redirects STDOUT to a directory such as '/var/log/containers {POD},' which is generally a well-established log management process handled by rsyslogd pod. This may, however, impose a double-write overhead and possible loss of log lines. Fluentbit is a fast log processor and forwarder for popular operating systems, and tracks updates to the established directory and then copies those updates across the internal network to rsyslog, which will write the lines to the corresponding log file within its persistent volume.

In an embodiment, the logging process is implemented in a way that provides a consistent logging framework with low risk of losing log lines, and maintaining low resource overheads with no major code changes between on-premises and cloud deployments. One or more defined policies may dictate log storage and removal schedules. For example, logs within pods and dedicated PVs are rotated and removed per a defined policy, and certain log quotas and retention rules at the node level may be defined, where quotas can be specified per node, application, service, and so on.

Logs are generally available outside of containers, but are not available if a node fails, however, the system can handle drive failures within a node. The system is configured to generate a support bundle from the logs. In system 100, a service or component crash generates a core file, which encapsulates the memory state stored in a file as a crash dump and which is used for debugging purposes. Core files and logs need to be stored persistently outside of pods, since pod memory is ephemeral, i.e., it is erased upon shutdown. Present systems typically store this information by writing directly to a single persistent volume (PV) or writing to local files through a sidecar container. Embodiments improve this method by providing additional PVs for selected services so that support bundle information is maintained in multiple locations for multi-node and multi-service environments to prevent failure of a single PV to result in log loss. Certain aggregations techniques are then used to generate a single support bundle for use by the vendor.

Figure 8:
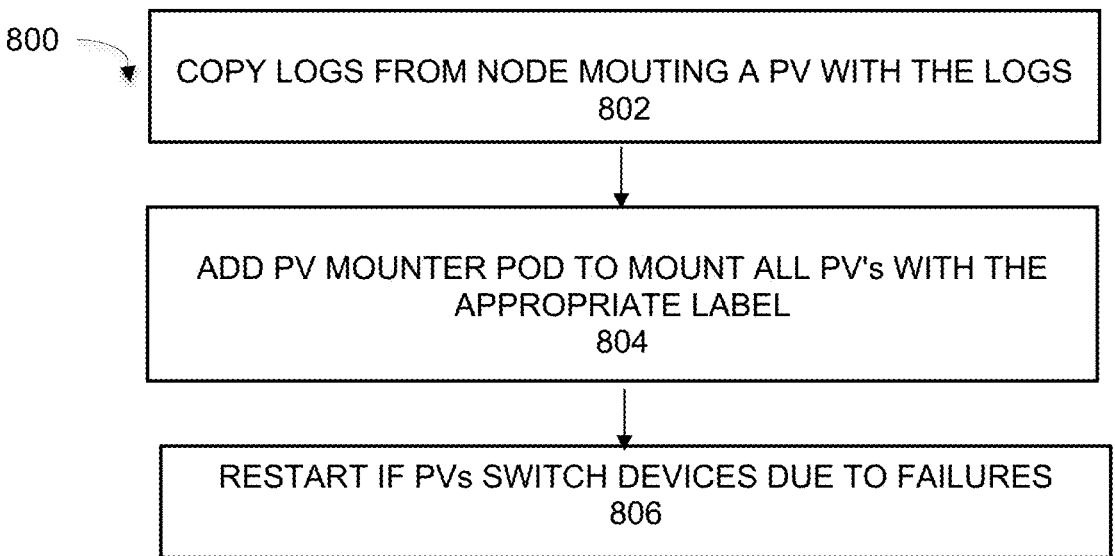
FIG. 8 is a flowchart that illustrates a method of collecting logs to generate a support bundle, under some embodiments.
Figure 9A:
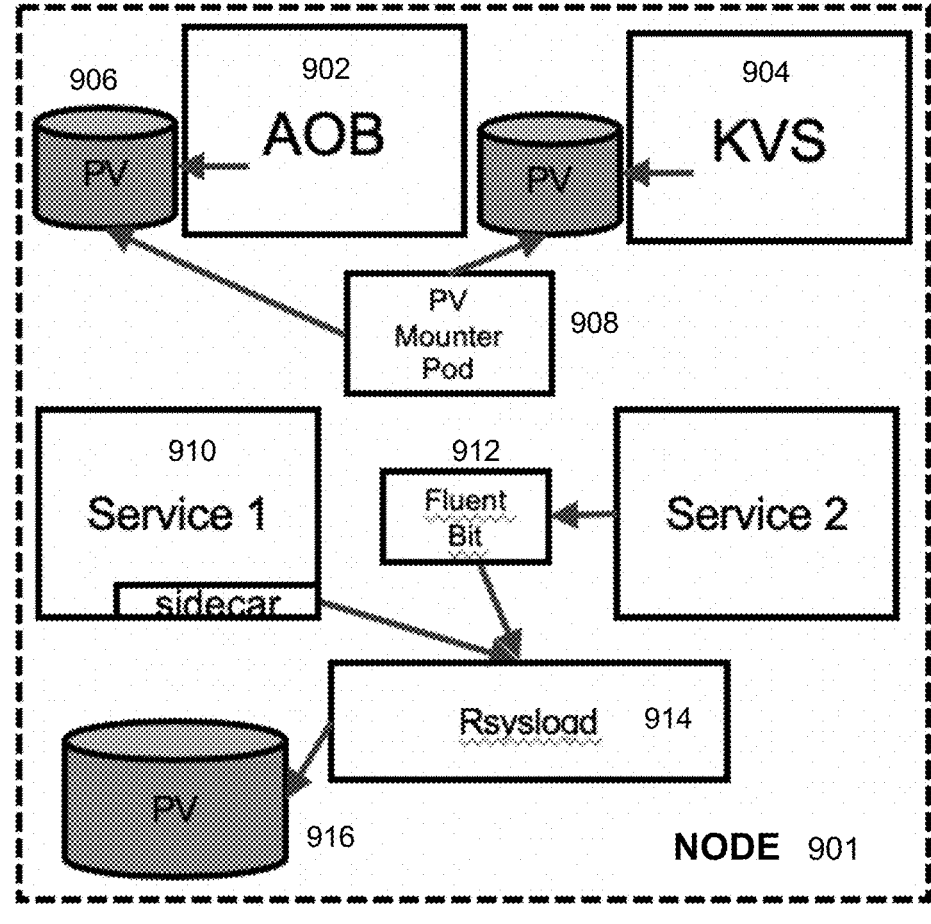
FIG. 9A illustrates a node implementing a log aggregation process, under some embodiments.

FIG. 8 is a flowchart that illustrates a method of collecting logs to generate a support bundle, under some embodiments. Process 800 of FIG. 8 generally illustrates a log aggregation process for a manageability process shown in FIG. 9A. As shown in FIG. 9A, a node 901 has storage components 902 (access object, AOB) and 904 (key-value store, KVS). For the embodiment of FIG. 9A, components 902 and 904 represent special or critical components/services that require certain needs such as node affinity (services restart on the same node only in the event of failure recovery), and that need to have their logs persevere, i.e., failure of a central PV or any other event that causes losing log lines is not acceptable. For this embodiment, a dedicated PV 906 is associated with each special service, along with the central PV 916. Other non-critical components (e.g., manageability or filesystem pods) can continue to use STDOUT or the sidecar with the single PV.

For the example embodiment of FIG. 9A, AOB component 902 is a type of content store that may store Lp trees, name spaces, and so on, and KVS 904 may be a key-value store for metadata. Other types of special storage may include DOB that is a segment store for a deduplication layer, and other similar resources. A respective persistent volume (PV) 906 is associated with each storage, where the PV is mounted using a PV mounter pod 908. In an embodiment the PV mounter pod 908 accesses the persistent volumes 906 used in a first logging case. The system needs a service to mount those persistent volumes so that it can access the logs to include in a support bundle. In some cases, the services that are writing to those persistent volumes may go offline due to software failures, so it cannot count on access logs through those services. The PV mounter pod represents a simple service that is unlikely to become unavailable so as to alleviate this possibility. Although specific example storage types (e.g., AOB and KVS) have been shown, it should be noted that any appropriate storage for objects and data elements may be used.

One or more services 910 using a sidecar or FluentBit 912 use the Rsyslogd function 914, which has its own PV 916 mounted. The support bundle collection job will then include logs from both rsyslog PV (916) and logging PV (906).

As shown in FIG. 8, to collect logs, the system tools copy from a node 901 mounting a PV 906 with the logs, step 802.

For this process, Rsyslogd pod 914 is likely to be running, and regular pods may be down. The process adds a PV mounter pod 908 mounts all PVs with the appropriate label, 804. The process may restart if the PVs switch devices due to failures, 806 and will likely also mount or crash-dump to core files. To create a support bundle, the system will log into to each PV mounter POD running on each node and access the logging PVs and copy the log files.

The logs information may be provided in any appropriate format and contents. For example, logs may be timestamped in ISO 8601 format and with the UTC timezone (e.g., 2020-03-18T22:00:55.040Z). This may then be converted to local time zone when displaying to users. The logs may be defined to encapsulate relevant information, such as [timestamp, severity, source, body].

In an embodiment, logs can be selected based on various different parameters or characteristics, such as keywords, component, data ranges, nodes, and so on. The configuration information that is gathered can be provided in a standard system or industry configuration, or it may be defined by individual or specifically tailored criteria, as needed.

In an embodiment, different log levels may be used to differentiate among different error/exception conditions and assign logging verbosity. Logs are thus provided in levels are of different verbosity of logging for activities such as debug, error, info, warning, and so on. Any practical number of log levels may be used depending on the number and type of different errors that may occur, and higher log levels imply greater logging activity, and the verbosity can be increased to collect extra logs to debug the problem. For example, the info level may have the least amount of logging and consists of function call history. In contrast, the debug level may be the most verbose and include all of the content from the info level as well as more detailed logging information about operations within functions.

Figure 9B:
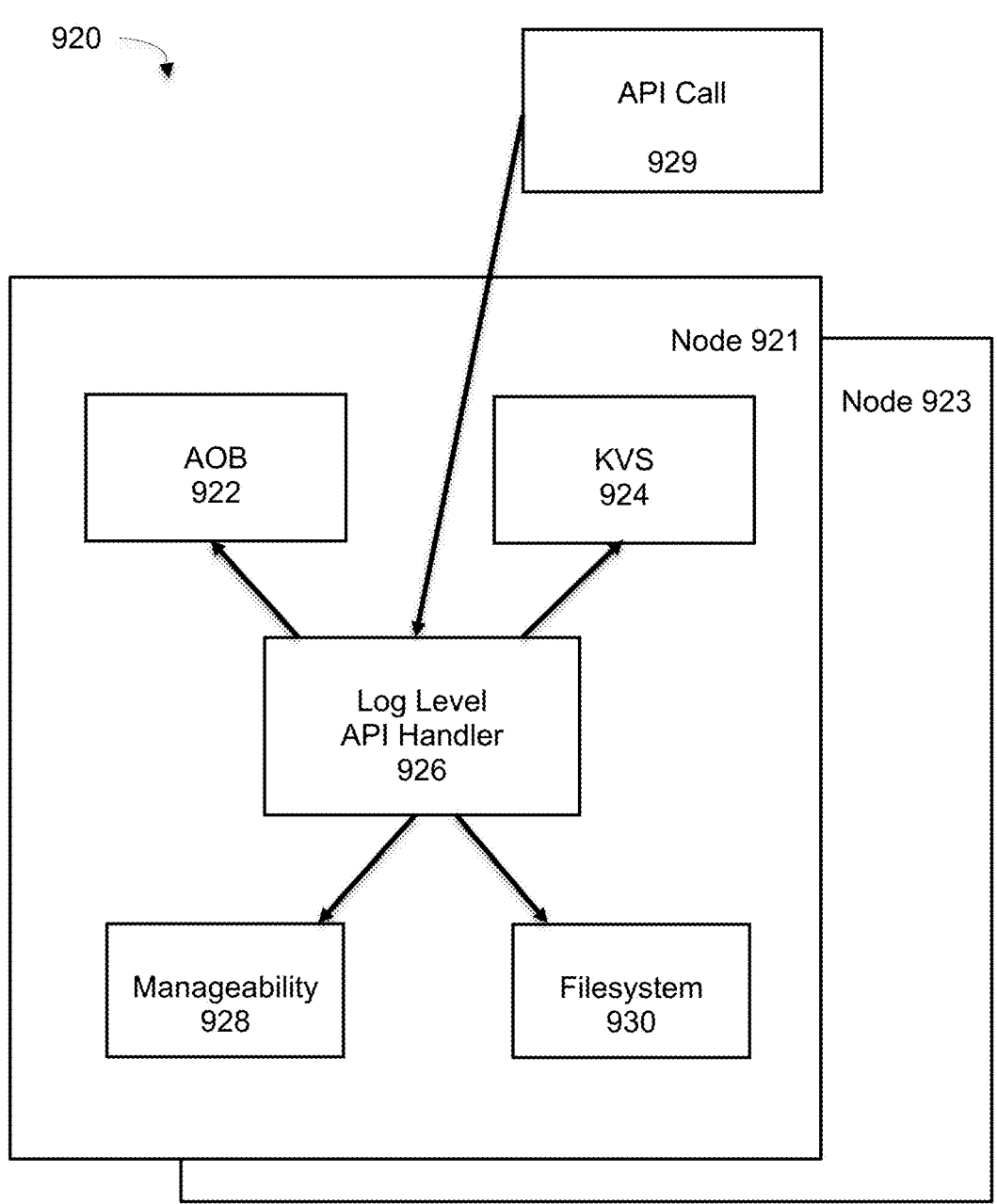
FIG. 9B illustrates a logging processing component implementing log levels, under some embodiments.

A UI or API function may be used to configure these log levels, for example by a UI/API call to set log level for one or multiple components. The implementation will be specific to each component. Some components may use a registry, while others may use an API. FIG. 9B illustrates a logging processing component implementing log levels in a multi-node cluster system, under some embodiments. System 920 of FIG. 9B illustrates an API implementation for configuring log levels. Any number of nodes may be present in the system, such as nodes 921 and 923. Each node has services or components, such as AOB storage 922 and KVS 924, for example. Log levels are set by a user or system admin (vendor) through API calls 929, and a special API handler 926 for setting the log levels configures the log levels in all of the components of the node, such as storage 922 and 924, along with manageability 928 and filesystem 930 services, for example.

FIG. 9B illustrates the use of API calls to set log levels, but other mechanisms are also possible, such as registries, command line interface (CLI) commands, metadata definitions, and so on.

The logs can be configured at different levels of granularity, such as per component-product, component, and node. The system is configured to set different log levels for different components within Santorini. For example, it can set the Data Domain services to log at a detailed level, while all other services on all nodes remain at a default level that has minimal logging. As another example, it may set the PPDM indexing service on node 1 to debug logging, while all other services on all nodes remain at a default level that has minimal logging.

Audit Log Processing

As shown in FIG. 1, system 100 includes an audit log service or processing component 124 within the cluster network 101. This component is used to produce and manage audit logs that may be needed for certain corporate and/or government requirements. As shown in FIG. 1, system 100 includes a process 124 to generate audit logs 128 from the logs processed by the logging processing component 118. These audit logs can then be passed on to an appropriate auditor or agency 130. As stated above, some organizations may be required to keep and manage system logs for audit purposes by corporate or government auditors, 130. The audit log service 124 generates audit logs that capture relevant information, such as event names, descriptions, timestamps, entities that create/edit/delete the event, and entities that are impacted by the event, etc., and conform the logs to any required format and management processes.

For the embodiment of FIG. 10, the audit logs 128 may be stored in a persistent volume (PV) to facilitate storage outside of the pod and for transfer to auditors or other external entities, as described in greater detail below.

FIG. 10 is a table illustrating logged events in a cluster network, under some embodiments. To conform with common requirements table 950 lists four main areas of events and activities that must be logged. These include system changes 952, authentication or authorization activities 954, privileged access activity 956, and audit-related activities 958.

The system changes 952 typically comprise system availability state changes (e.g., shut downs), component/memory failures and errors, configuration changes (e.g., adding a device or installing an application or enabling a service), and changes to source code in production or configuration changes in a production system.

Authentication and authorization 954 activities typically comprise authentication failures and warnings (e.g., login failures and account lockouts), failed accesses (e.g., insufficient permissions to access a database or transaction), and identity and access provisioning activities that can include creating new accounts, granting new permissions or changing existing permissions.

Privileged access 956 typically comprise attempted access to privileged functions (e.g., running the administrative console or logging in as a normal user account), and all actions taken by any individual with root or administrative privileges.

Audit-related activities 958 typically comprise actions such as changing the event logging configuration or deleting event logs, and audit log failures.

FIG. 10 is provided for purposes of example only, and other or different system events and interactions can also be included, depending on requirements, applications and system configuration and constraints.

In an embodiment, the system consolidates all of the local logs (log files) from all of the system components (nodes and pods), and which can also be displayed through a GUI. The audit logs information is stored persistently in one or more persistent volumes (PVs) outside of the pods. A specialized audit log management system with high availability is made available to all components. With respect to storage, hashes of the log files are stored separately from the log files themselves so that the files are tamper proof. Audit logs can be exported to external, secure syslog server. Audit logs can be made subject to defined retention policies, as needed.

Audit logs are formatted such that they conform with a common audit logging format (e.g., EL1). Such a format may include sender, receiver, and other specified details. All specified user operations are logged, and each log entry includes details of who, when, and what action was performed on a particular component for audit review purposes. Old and new values are captured and stored. A consistent format for audit logs is used so that users can analyze when logs are exported, and the consolidated logs can be displayed through the GUI.

In an embodiment, local copies of audit logs are retained for viewing for a specified number of days if needed, and even in the event the external syslog server is available. Audit logs are not changeable, but utilities may be provided to allow user annotation.

The GUI can be configured to allow a user, vendor, or auditor to view the entire cluster system (Santorini's) audit logs. Alerts can be raised when the audit logging service is offline. In order to maintain integrity of the logging process, the system may reject operations if they cannot be logged.

In an embodiment, the audit logging service 124 can be configured to conform to any of the Event Logging (EL) levels defined by the US government, or similar requirements by other governments or agencies. Presently these guidelines specify four levels from EL0 (Not Effective) to EL3 (Advanced). For example, to meet the EL1 level (Basic), the audit logging feature must meet certain requirements, such as basic logging categories (administrator actions, faults, and system events), minimum logging data, and a set time standard (ISO 86801 UTC, same as debug logs). In addition, log forwarding must be allowed, and log information must be protected and validated, and the system must use passive DNS. Other requirements may include Cybersecurity Infrastructure Security Agency (CISA) and Federal Bureau of Investigations (FBI) access requirements, and implementation of Logging Orchestration, Automation, and Response (SOAR), and user behavior monitoring.

In an embodiment, the logs generated by all of the system components are aggregated by process 124 using a log aggregator, such as Fluentbit. This process may use a regular expression filter (regex) or similar function to copy log lines to an audit log management system. Components with an audit file can also configure a sidecar just for the audit file to redirect those logs.

Figure 11:
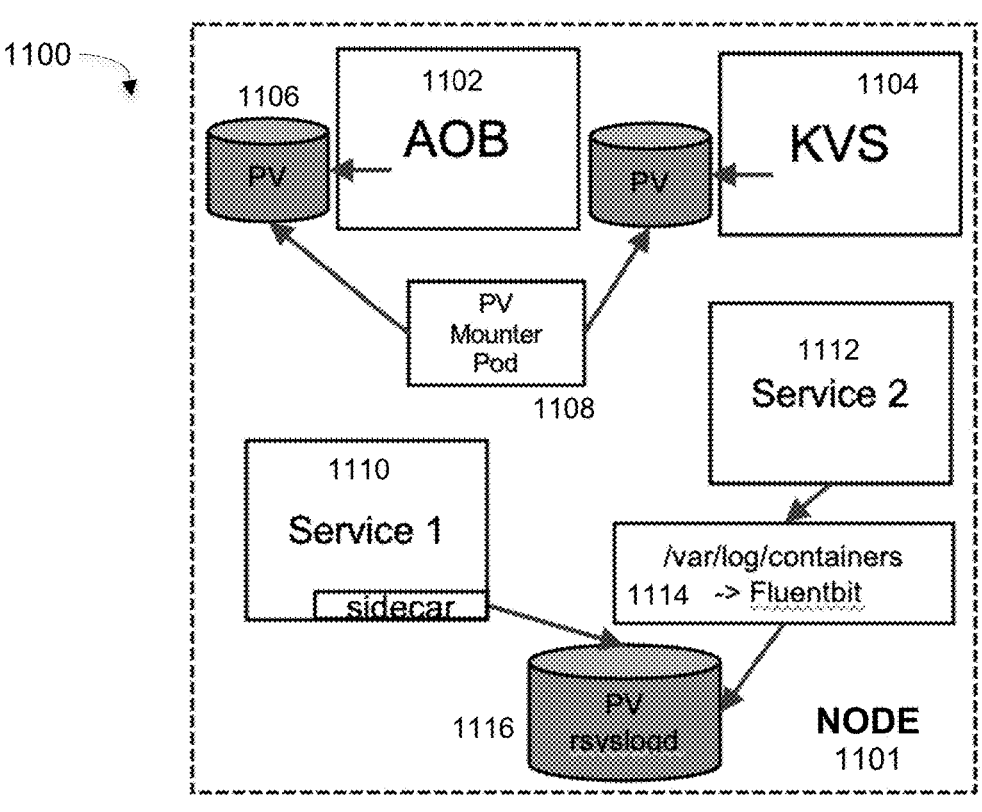
FIG. 11 illustrates a log aggregation process in a node for audit log generation, under some embodiments.

FIG. 11 illustrates a log aggregation process in a node for audit log generation, under some embodiments. As shown system 1100 of FIG. 11, a node 1101 has storage components 1102 (AOB) and 1104 (KVS). A respective persistent volume (PV) 1106 is associated with each storage, where the PV is mounted using a PV mounter pod 1108. In an embodiment the PV mounter pod 1108 accesses the persistent volumes 1106 used for logging.

One or more services 1110 using a sidecar or FluentBit 1112 use the Rsyslogd function 1114 in PV 1116. The log management system will then receive logs from both rsyslog PV (1116) and logging PVs (1106).

For the embodiment of FIG. 11, the process writes to STDOUT (standard output) and uses Fluentbit, which is standard for new microservices. The Kubernetes system typically redirects STDOUT to/var/log/containers {POD}, as shown in 1114.

As shown for a first service (1110), the process can write to local files and use a sidecar. Many application pods (e.g. DD pods) already write logs to local files, so a sidecar can be used to track certain directories and file extensions for updates. The sidecar will copy the log lines to the persistent location, PV 1116.

As shown for a second service (1112), the process can also write log files directly to the persistent location 1116. This may be supported only in limited cases, depending on system configuration.

Figure 12:
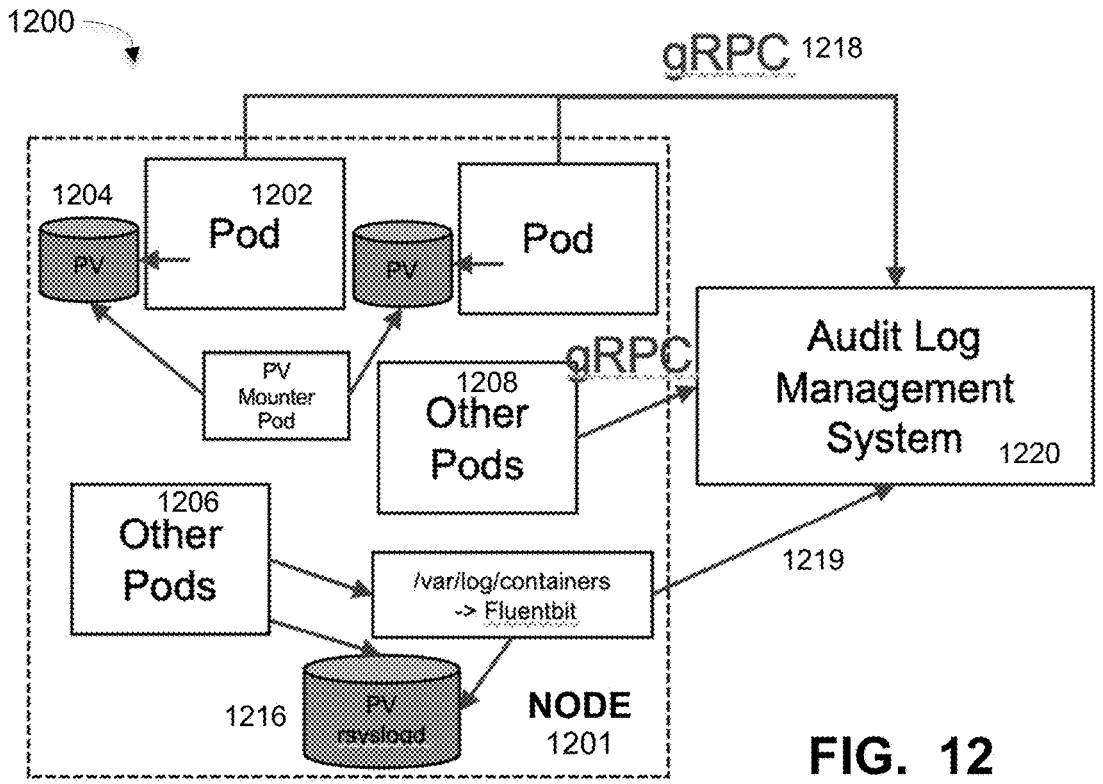
FIG. 12 illustrates a process of transferring audit logs from a node, under some embodiments.

Once generated, the audit logs are transferred to an audit log management system. FIG. 12 illustrates a process of transferring audit logs from a node, under some embodiments. As shown in FIG. 12, system 1200 comprises a node 1201 coupled to an audit log management system 1220. The node 1201 comprises a number of pods 1202 that have their own PVs 1204 using a mounter pod, as described above with respect to FIG. 11. The node also includes other pods 1206 that use PV 1216 through a sidecar or directly, again as described above with respect to FIG. 11. In an embodiment the pods of node 1201 write to the audit log management system through remote procedure calls (gRPC) 1218 or direct links 1219.

In an embodiment, gRPC 1218 adjusts DD code paths that write to a database to use gRPC to write to the audit log management system 1220. This allows the process to confirm transfer, handle errors, and reject operations that cannot be recorded. For non-DD components, there is an option to configure Fluentbit or the sidecar to perform a direct transfer 1219 of audit logs to the audit log management system 1220. A single sidecar can transfer debug logs and audit logs to different endpoints, depending on system configuration.

The audit log management system is generally configured to provide cluster-wide management of logs for auditable events, meaning events that are specified by security protocols such as White House Executive Order Executive Order M-21-30 "Protecting Critical Software Through Enhanced Security Measures." The audit log management system is designed to securely store audit logs and meet security requirements for availability, protection against tampering, and secure access, and it has replicated storage across multiple nodes to protect against data loss related to a node failure. The internal storage is protected with cryptographically secure hash values stored in hashicorp storage that can be used to detect any modification to the audit logs. Only appropriate personnel (e.g., security officers) are granted the levels of access necessary and securely access the logs. There is also a requirement that a user can configure a secondary site, external to the cluster, that will receive a copy of the audit logs.

The system supports several ways to transfer audit logs from the source services to the audit log management service. In one embodiment, the system uses remote procedure calls (gRPC) through which a service can directly call an API to send the audit log to the audit log management service, which will store the event and reply with success or failure to the source service. In this way, the source service can log an auditable event before implementing the event, such as allocating storage for customers or changing passwords. For legacy source services that cannot be updated to use gRPC, the system provides alternative options, such as a sidecar that can be configured to track that file and send the audit logs to the audit log management service if a service writes its audit logs to a local files.

In an embodiment where a service writes its audit logs to standard output (STDOUT/STDERR), Fluentbit can be configured to track those updates and send the audit logs to the audit log management service.

In all cases, the transfer to the audit log management system is itself protected by a cryptographically secure mechanism (mTLS) to transfer information between services, and that uses certificates established within the cluster when it is manufactured or first configured.

Figure 13:
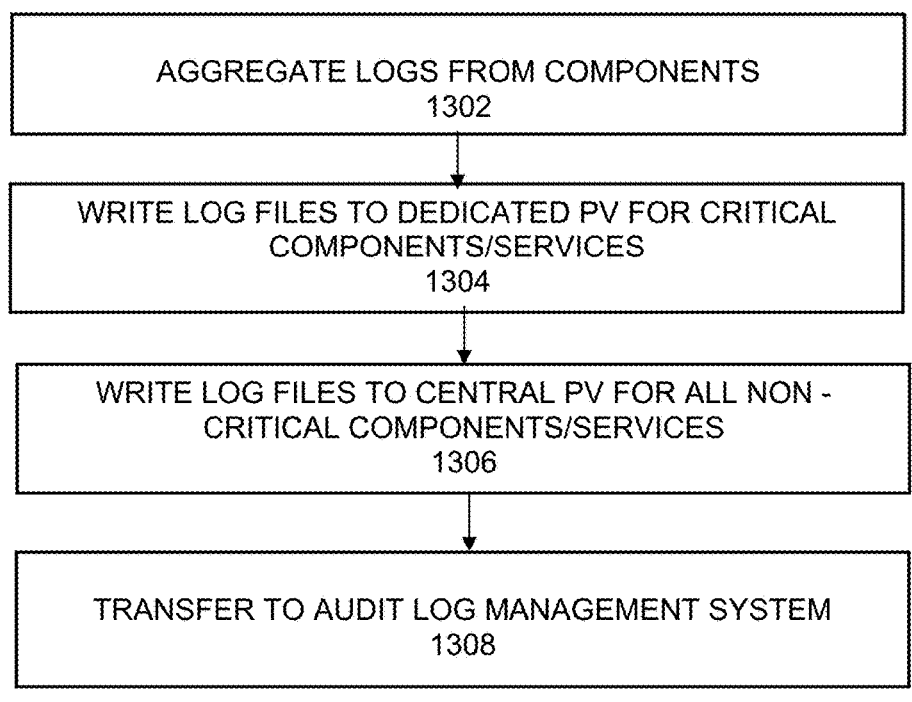
FIG. 13 is a flowchart illustrating a process of aggregating and transferring logs to an audit management system, under some embodiments.

FIG. 13 is a flowchart that illustrates an overall method of providing audit log management for a cluster network, under some embodiments. The process of FIG. 13 starts with aggregating logs from the different components and services in the system, 1302, such as described above with respect to FIG. 9A. Log files for critical components/services are written to dedicated PV locations, 1304, while log files for all other components/services are written to a central PV location. If an audit is initiated, the log files are then transferred to an audit log management system, 1308, such as described above with reference to claim 12.

Embodiments are thus described for a multi-node, multi-container cluster system that generates, aggregates, and manages log files from services and components to be used for audit logs and to debug and perform other service bundle related tasks provided by a vendor of the cluster system.

Figure 14:
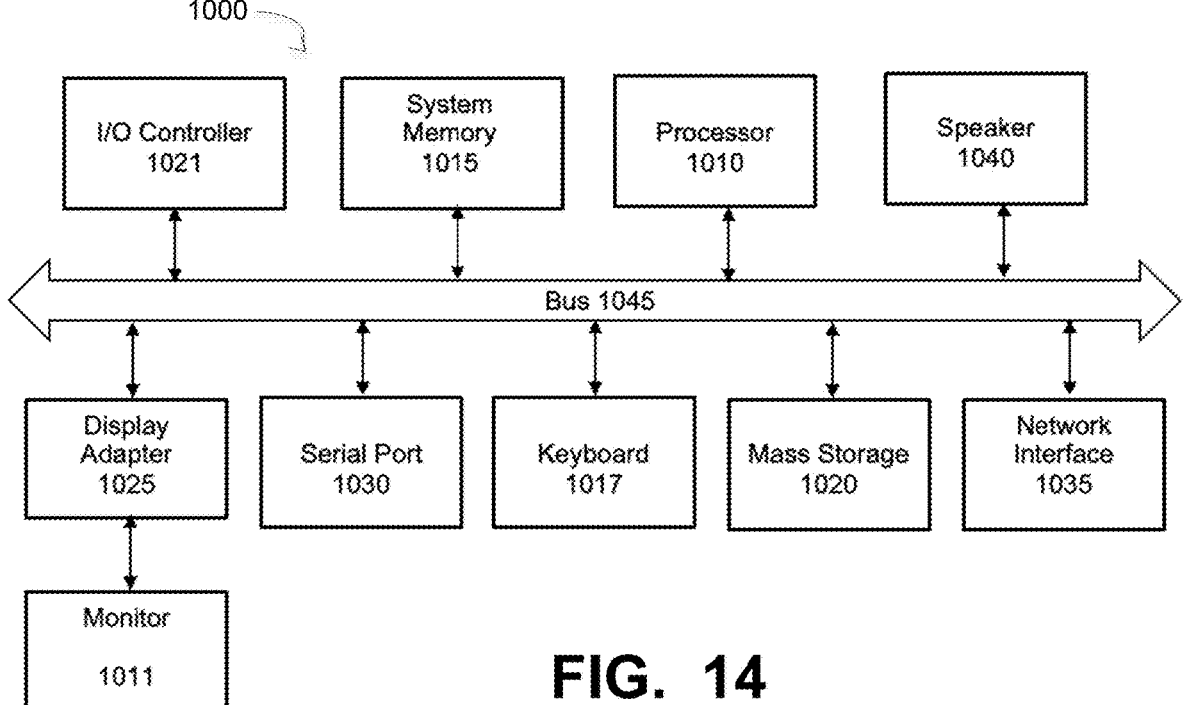
FIG. 14 is a block diagram of a computer system used to execute one or more software components for providing serviceability in a distributed system, under some embodiments.

FIG. 14 is a block diagram of a computer system used to execute one or more software components of a logging and audit log generation processing component, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of logging activities in a cluster system having a plurality of nodes executing containerized applications, the method comprising:

collecting logs for each node of a plurality of nodes in the cluster system, wherein the logs record transactions of the nodes during execution of the applications;

generating, for the entire cluster system, log files from the logs for each node;

aggregating the logs into a consistent audit log format to produce audit logs, wherein the audit log format dictates inclusion of information including sender ID, receiver ID, specified user operations, and actions performed in the cluster system, and further facilitates display of log information to a user through a graphical user interface and transfer of the logs to an audit log management system;

storing the log files in one or more persistent volume locations outside of any application pod of the cluster system; and providing, upon request, the audit logs to an auditor, wherein the audit logs are produced to conform the cluster system to one or more security protocols as required by corporate or government agencies and that dictate minimum data security requirements for availability, protection against tampering, and secure access, and are configured to conform to a government defined Event Logging (EL) level that specifies four levels of data security that meet defined requirements including logging categories, minimum logging data, defined time standards, and allowance for log forwarding must be allowed.

2. The method of claim 1 wherein the aggregating step is performed by a log aggregator component that uses a regular expression filter to copy audit log lines to an audit log management system.

3. The method of claim 2 wherein the applications comprise critical applications and non-critical applications, the method further comprising writing log files for non-critical applications to one of a local file using central persistent volume (PV) using one of a standard output function and a log forwarder utility, or a sidecar container that tracks log files in a pod and that transfer the log files to other services.

4. The method of claim 3 further comprising:

writing log files for critical applications directly to a first PV dedicated to each critical application, wherein a critical application is an application that requires node affinity; and writing the log files directly to a second PV dedicated to the audit logs.

5. The method of claim 4 further comprising using a PV mounter pod to mount each dedicated PV to a respective component.

6. The method of claim 1 wherein the logs are collected for events including system changes, authorization activities, privileged access events, and audit related activities, and wherein the system changes comprise component failures and changes to availability, configuration, or source code; the authorization activities comprise login or access failures and access provisioning; the privileged access events comprise using a superuser status or running an administrator console; and the audit-related activities comprise changing event logging configurations, deleting event logs, or audit log failures.

7. The method of claim 1 wherein the cluster system comprises a Santorini network processing containerized data utilizing a Kubernetes-based framework, and wherein the cluster system comprises part of a Data Domain deduplication backup system performing backup and restore operations for the nodes, and wherein the containerized applications comprise at least one of a Data Domain container running deduplication and compression processes, a cloud-native data protection manager, and a scalable object storage manager.

8. A method of providing to an auditor, log information for a cluster system having a plurality of nodes executing containerized applications, comprising:

monitoring system operation to detect a problem in the cluster system;

logging activity of the cluster system as the applications are executed;

generating log files from logs around a time of the problem for each node to form collected data that is combined with system statistics and system information; and aggregating the log files into audit logs for provision upon request to the auditor, wherein the cluster system comprises a Santorini network processing containerized data utilizing a Kubernetes-based framework, and wherein the cluster system comprises part of a Data Domain deduplication backup system performing backup and restore operations for the nodes, and wherein the containerized applications comprise at least one of a Data Domain container running deduplication and compression processes, a cloud-native data protection manager, and a scalable object storage manager.

9. The method of claim 8 wherein the logs comprise information related to at least one of: component availability state changes, component failures and errors, configuration changes, changes to source code in production, or configuration changes in a production system; and wherein the system statistics comprise performance and activity data for applications executed by the networked nodes, including read/write latencies, read/write throughputs, replication throughput, and garbage collection performance; and further wherein the system information comprises total storage capacity, currently utilized storage capacity, and remaining storage capacity.

10. The method of claim 9 wherein the audit log format facilitates display of log information to a user through a graphical user interface and transfer of the logs to an audit log management system, and further wherein the audit log format dictates inclusion of information including sender ID, receiver ID, specified user operations, and actions performed by the component.

11. The method of claim 10 wherein the audit logs are produced to conform the cluster system to one or more security protocols as required by the auditor and that dictate minimum data security requirements for availability, protection against tampering, and secure access, and further wherein the audit logs are configured to conform to a government defined Event Logging (EL) level that specifies four levels of data security that meet defined requirements including logging categories, minimum logging data, defined time standards, and allowance for log forwarding must be allowed, and wherein the auditor comprises a corporate or governmental agency.

12. The method of claim 8 wherein the applications comprise critical applications and non-critical applications, the method further comprising:

writing log files for non-critical applications to one of a local file using central persistent volume (PV) using one of a standard output function and a log forwarder utility, or a sidecar container that tracks log files in a pod and that transfer the log files to other services;

writing log files for critical applications directly to a first PV dedicated to each critical application, wherein a critical application is an application that requires node affinity;

writing the audit log files directly to a second PV dedicated to the audit logs; and using a PV mounter pod to mount each dedicated PV to a respective component.

13. A system for logging activities in a cluster system having a plurality of nodes executing containerized applications, the system comprising:

a collector component collecting logs for each node of a plurality of nodes in the cluster system, wherein the logs record transactions of the nodes during execution of the applications;

a log file generator generating, for the entire cluster system, log files from the logs for each node;

an aggregator aggregating the logs into a consistent audit log format to produce audit logs; and a hardware data store storing the log files in one or more persistent volume locations outside of any application pod of the cluster system, wherein the cluster system comprises a Santorini network processing containerized data utilizing a Kubernetes-based framework, and wherein the cluster system comprises part of a Data Domain deduplication backup system performing backup and restore operations for the nodes, and wherein the containerized applications comprise at least one of a Data Domain container running deduplication and compression processes, a cloud-native data protection manager, and a scalable object storage manager, and wherein an auditor of the log files comprises a corporate or government agency.

* * * * *